(12) United States Patent
Westerinen et al.

(10) Patent No.: US 7,228,444 B2
(45) Date of Patent: *Jun. 5, 2007

(54) SYSTEM AND METHOD FOR PRESERVING STATE DATA OF A PERSONAL COMPUTER IN A STANDBY STATE IN THE EVENT OF AN AC POWER FAILURE

(75) Inventors: William J. Westerinen, Issaquah, WA (US); Jason M. Anderson, Snoqualmie, WA (US); Allen Marshall, Woodinville, WA (US); Tony D. Pierce, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/342,502

(22) Filed: Jan. 30, 2006

(65) Prior Publication Data

US 2006/0123258 A1    Jun. 8, 2006

Related U.S. Application Data

(63) Continuation of application No. 10/383,091, filed on Mar. 6, 2003.

(60) Provisional application No. 60/422,428, filed on Oct. 30, 2002.

(51) Int. Cl.
G06F 1/30 (2006.01)
G06F 1/28 (2006.01)
G06F 1/26 (2006.01)
H02J 7/35 (2006.01)

(52) U.S. Cl. .............. 713/300; 713/320; 713/324; 713/330; 713/340; 713/321; 713/323; 307/66

(58) Field of Classification Search ............ 713/300, 713/320, 324, 330, 340
See application file for complete search history.

(56) References Cited

U.S. PATENT DOCUMENTS

| 5,944,828 | A  | * | 8/1999  | Matsuoka ............. 713/323 |
| 6,243,831 | B1 |   | 6/2001  | Mustafa et al. |
| 6,266,766 | B1 |   | 7/2001  | O'Connor ............. 712/217 |
| 6,266,776 | B1 | * | 7/2001  | Sakai ................. 713/300 |
| 7,131,011 | B2 | * | 10/2006 | Westerinen et al. ...... 713/300 |
| 2001/0047492 | A1 | * | 11/2001 | Tsui et al. ............ 713/320 |

(Continued)

FOREIGN PATENT DOCUMENTS

| DE | 43 09 369 A1 | 9/1994 |
| EP | 0 805 386 A1 | 11/1997 |
| WO | WO 94/16377 | 7/1994 |

*Primary Examiner*—Rehana Perveen
*Assistant Examiner*—Michael J. Brown
(74) *Attorney, Agent, or Firm*—Woodcock Washburn LLP

(57) ABSTRACT

A mechanism is provided for a personal computer to preserve user and system state data in the event of an AC power failure when the computer is in a standby state. When the AC power failure occurs, a switchover circuit connects a rechargeable energy storage medium, such as a rechargeable battery, to the power supply of the computer for powering components of computer, and the computer is awaken. A critical battery alarm is then issued to trigger the operating system of the computer to perform a transition into a hibernation state, during which the state data of the computer are persistently stored. The energy storage medium is disconnected from the power supply after the computer system has entered hibernation.

11 Claims, 4 Drawing Sheets

U.S. PATENT DOCUMENTS

2002/0138772 A1* 9/2002 Crawford et al. ........... 713/300
2003/0009702 A1* 1/2003 Park .......................... 713/300
2005/0055498 A1* 3/2005 Beckert et al. ............. 711/104

* cited by examiner

SYSTEM AND METHOD FOR PRESERVING STATE DATA OF A PERSONAL COMPUTER IN A STANDBY STATE IN THE EVENT OF AN AC POWER FAILURE

RELATED APPLICATION

This application is a continuation of U.S. patent application Ser. No. 10/383,091 filed Mar. 6, 2003, which claims the benefit of U.S. Provisional Application No. 60/422,428, filed Oct. 30, 2002.

TECHNICAL FIELD

This invention relates generally to power management of a computer, and more particularly to a mechanism that enables a simple power on/off model for a personal computer that uses a volatile standby state as the default "off" state to provide an "instant-on" user experience while preserving user and system state in the event of an AC power failure.

BACKGROUND OF THE INVENTION

Powering a computer up and powering it down are basic operations of the computer. To that end, a computer typically has a power button on its housing (e.g., on its front panel) that a user can press to initiate a power-up or power-down operation of the computer. Besides the working state and the power-off states, many modern personal computers implement power-saving states defined in the Advanced Configuration and Power Interface (ACPI) specification. Depending on the power-saving scheme implemented in the computer, the power button may be used to bring the computer from the normal working (i.e., "on") state to one of the power-saving states in which the computer is partially powered, such as the S1–S3 states of the ACPI, or to a power-down state, such as the S4 or S5 state of the ACPI.

The implementation of a sophisticated power-saving scheme with various power states, however, can turn the task of shutting off a personal computer (PC) into a complicated matter for non-technical users. A user needs to know the differences between the "standby/sleep," "hibernate," and true "off" power states, and to understand the tradeoffs between those different power states. For instance, the user has to decide whether to put the computer into the "off" state that will save data fully but will require a full reboot later, or to put the machine into the standby state that allows the computer to return to the "on" state quickly but does not preserve the state data of the machine if the power fails. In addition, the way a computer is shut down affects the way it responds when the user presses its power button. For instance, if the computer is in the "standby" state, it can quickly return to the "on" state (under 2 seconds), while if it is in the "off" state a long time will be required for the computer to boot back up to the "on" state (15–45 seconds). The different ways the computer may respond to the pressing of the same power button can create an inconsistent and confusing user experience. This is in sharp contrast to normal home appliances, such as a stereo system or a television, that have simple on/off states.

One possible way to implement a simple on/off model in a personal computer is to select an intermediate power-saving state, such as the S3 "standby" state of the ACPI specification, as the default "off" state. When the user presses the power button to turn the computer "off," the computer system goes into the standby state instead of completely powering down (the ACPI S5 state). When the user presses the power button to turn the computer back on, the computer wakes from the standby state and resumes the working state (the ACPI S0 state). In addition to the simplified and consistent user experience, an important advantage of this simple power on/off model is that the computer can quickly transition from the standby state to the working state, thus providing an "instant-on" experience.

This simple on/off model, however, has a significant problem. A standby state is typically a volatile state in the sense that the system and user state data are not persistently stored (e.g., on the hard drive) when the system transitions from the working state into the standby state. If the computer is in a standby state and the AC power fails or is interrupted, or the computer is accidentally unplugged, the computer will lose its user and system state data and other data held in the RAM (e.g., open and unsaved documents and files) if they were not saved prior to the AC power loss. When the AC power returns, the computer will have to boot up and cannot return to the previous user state it was in prior to the AC power failure. As a result, the user has to re-start all of the applications that were previously running prior to the AC power failure.

SUMMARY OF THE INVENTION

In view of the foregoing, the present invention provides a mechanism for preserving user and system state data of a personal computer in the event of an AC power loss when the computer is in a standby state. This mechanism uses an energy storage medium, such as a battery, for powering the operations or the computer when the AC power fails. When the computer is in the standby state and the AC power failure occurs, a switchover circuit connects the DC output voltage of the energy storage medium to the computer power supply for powering the internal components of computer but not the external peripheral devices, and the computer is waken up and returned to the working state. A battery driver then issues a critical battery alarm, even though the battery is not at a low voltage level. The critical battery alarm triggers the operating system of the computer to perform a transition into a hibernation state, during which the state data of the computer are persistently stored (i.e., stored in a nonvolatile memory to prevent data loss). The energy storage medium is then disconnected from the power supply after the computer system has entered hibernation. When the AC power returns, the computer can reboot and restore the state data, and then return to the standby state it was in prior to the AC power loss.

DETAILED DESCRIPTION OF THE INVENTION

Figure 1:
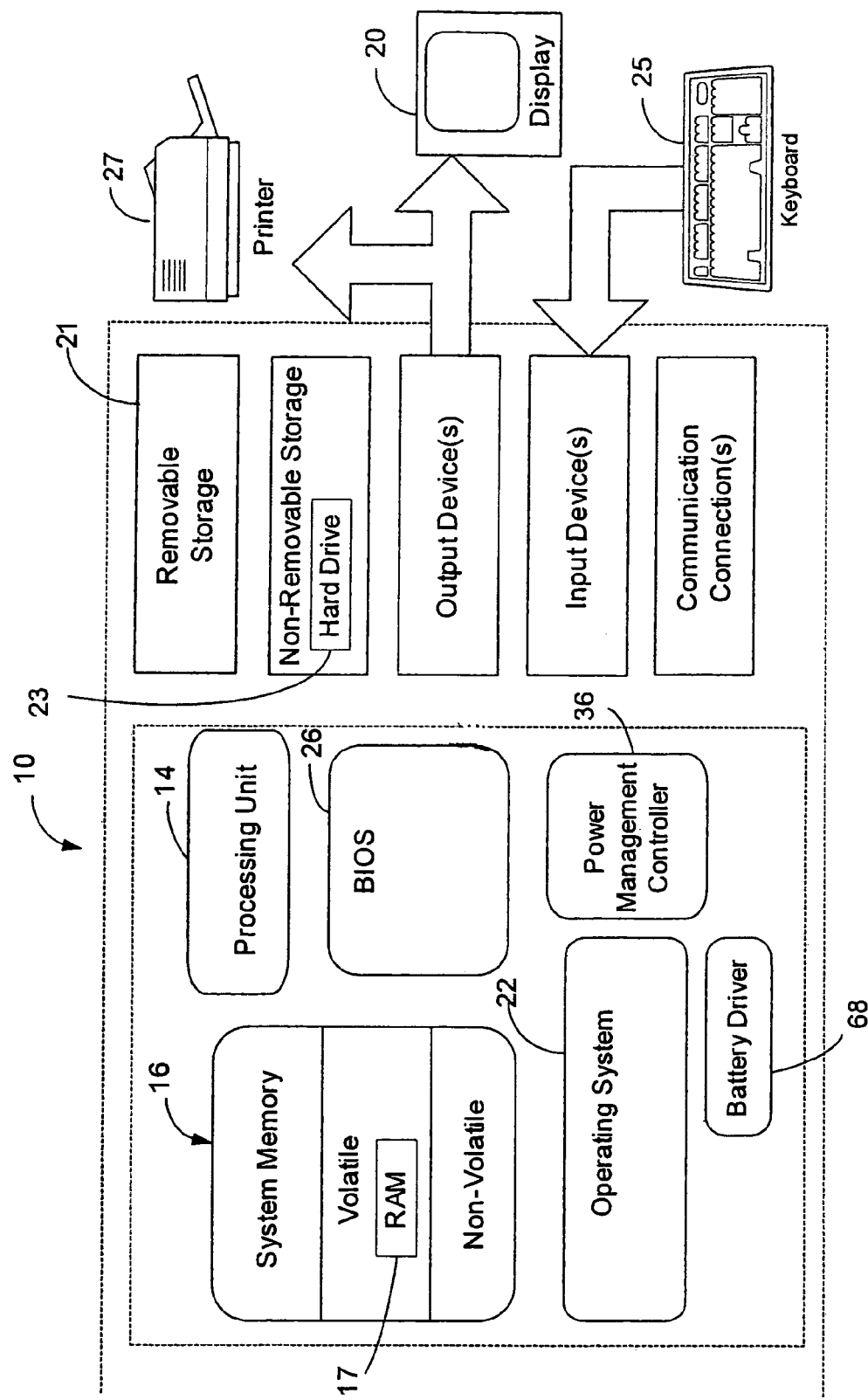
FIG. 1 is a block diagram generally illustrating an exemplary computer system in which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used to implement an embodiment of the invention, and the mechanism of the invention for preserving state data in the event of an AC power failure when the computer is in a standby state will be described in greater detail with reference to FIGS. 2–4. Turning now to FIG. 1, an example of a basic configuration for a computer on which all or parts of the invention described herein may be implemented is shown. In its most basic configuration, the computer 10 typically includes at least one processing unit 14 and memory 16. The processing unit and system memory are typically mounted on a motherboard of the computer 10. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some results. At least some of these instructions are generated by an operating system 22. The operating system 22 may include several user mode and kernel mode programs. Depending on the exact configuration and type of the computer 10, the memory 16 may be volatile (such as a RAM 17), non-volatile (such as a ROM or flash memory) or some combination of the two.

Additionally, the computer may also have additional features/functionality. For example, computer 10 may also include additional storage (such as a removable storage 21 and/or a non-removable storage, such as a hard drive 23) including, but not limited to, magnetic or optical disks or tape, removable flash memory devices, etc. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

The computer also includes a Basic Input/Output System (BIOS) 26, which is conventionally an essential set of routines in a personal computer. The BIOS 26 is typically stored on a chip and provides an interface between the operating system and the hardware. The BIOS 26 supports the peripheral technologies and internal services such as the real-time clock (time and date). On startup, the BIOS 26 tests the system and prepares the computer for operation by querying its own small CMOS memory bank for drive and other configuration settings. It searches for other BIOS's on the plug-in boards and sets up pointers (interrupt vectors) in memory to access those routines. It then loads the operating system and passes control to it. The BIOS accepts requests from the drivers as well as the application programs. As will be described in greater detail below, in a preferred embodiment of the invention, the BIOS 26 is programmed to be part of the mechanism for preserving the state data of the computer in the event of an AC power failure that occurs when the computer is in a standby state.

The computer 10 further includes a power management controller 36 for supporting different power states, such as the ACPI S1–S5 states. The power management controller 36 is typically implemented as firmware in an integrated circuit (IC), which is typically mounted on the motherboard of the computer. As described in greater detail below, in a preferred embodiment, the power management controller 36 is also involved in the mechanism for preserving the state data in response to an AC power failure.

The computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term "computer-readable medium" as used herein includes both computer storage media and communication media.

The computer 10 may also have input devices such as a keyboard 25, mouse, pen, voice input device, touch input device, etc. Output devices such as a display 20, speakers, a printer 27, etc. may also be included. The general operations of all these devices are well known in the art and need not be discussed at length here.

Figure 2:
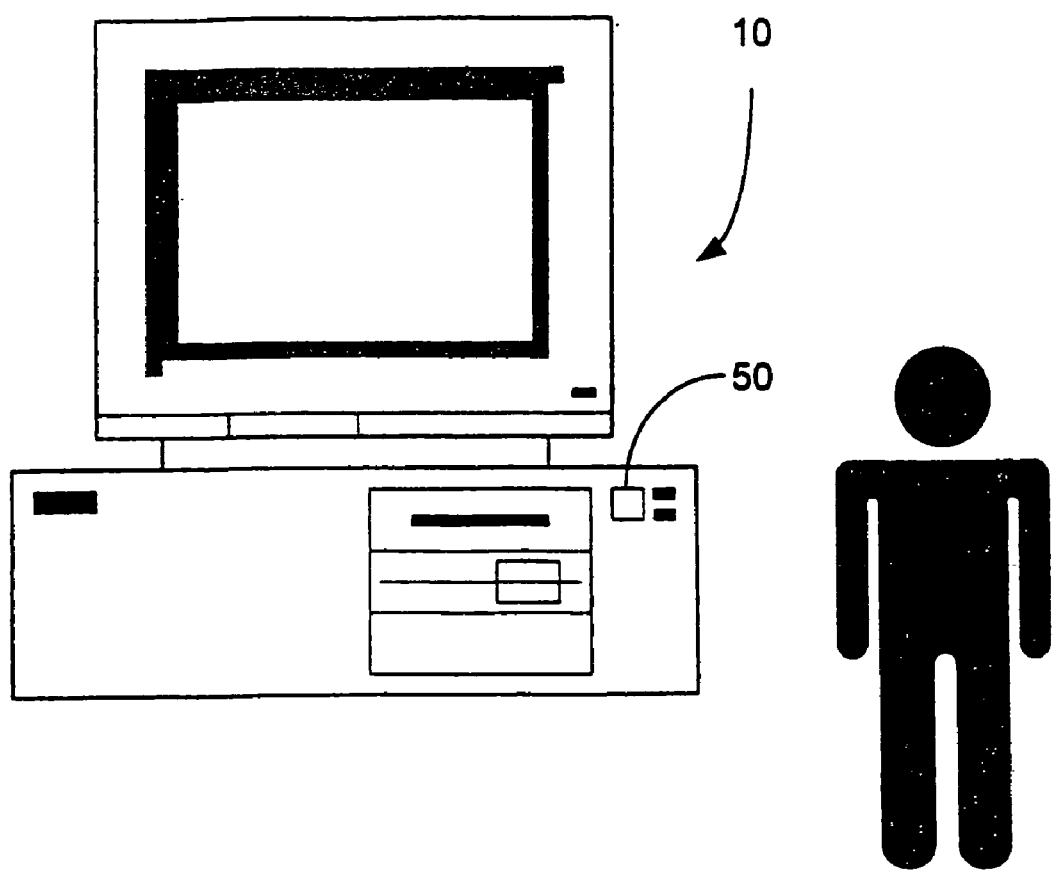
FIG. 2 is a schematic diagram of a desktop personal computer having a power button for turning the computer on or off.

Referring to FIG. 2, the present invention is directed to a mechanism for preserving the system and user state data of a desktop computer when an AC power failure occurs while the computer is in a standby state. This mechanism enables the computer to implement a simple on/off user model that uses a volatile standby state as its default "off" state so as to provide an "instant-on" experience. As used herein for purposes of describing and claiming the invention, the term "standby state" means a power-saving state that provides at least the electrical power needed to preserve contents of the RAM of the computer and to watch for a wake-up event. This term is also intended to be interchangeable with the term "sleep state." In a preferred embodiment, the standby state is the S3 state defined by the Advanced Configuration and Power Interface (ACPI) specification.

With the simple on/off model implemented in the computer, when the computer 10 is in the working or "on" state (e.g., the S0 state of the ACPI specification) and the user presses the power button 50 to "turn off" the computer, the computer is not really turned off in the sense that it is completely powered off (e.g., the ACPI S5 state). Instead, the computer is put into the standby mode that preserves the system state in the RAM. When the user later presses the power button to turn the computer on, the computer wakes from the standby state and resumes the working state. Since the state data are maintained in the RAM, the computer can quickly "wake up" and return to the "on" state, and the same files will be open and the same applications will be running as before the transition to the standby state took place. In a preferred embodiment, the standby state corresponds to the S3 state of the ACPI specification. The S3 state, which is also often called the "suspend to RAM" state, is a relatively deep power-saving mode. In this mode, most components of the computer, including the CPU and the cache, are shut down except for a small amount of power needed to keep the contents of the RAM of the computer from fading away, and to keep the power management controller 36 on to listen for a wake-up event.

Figure 3:
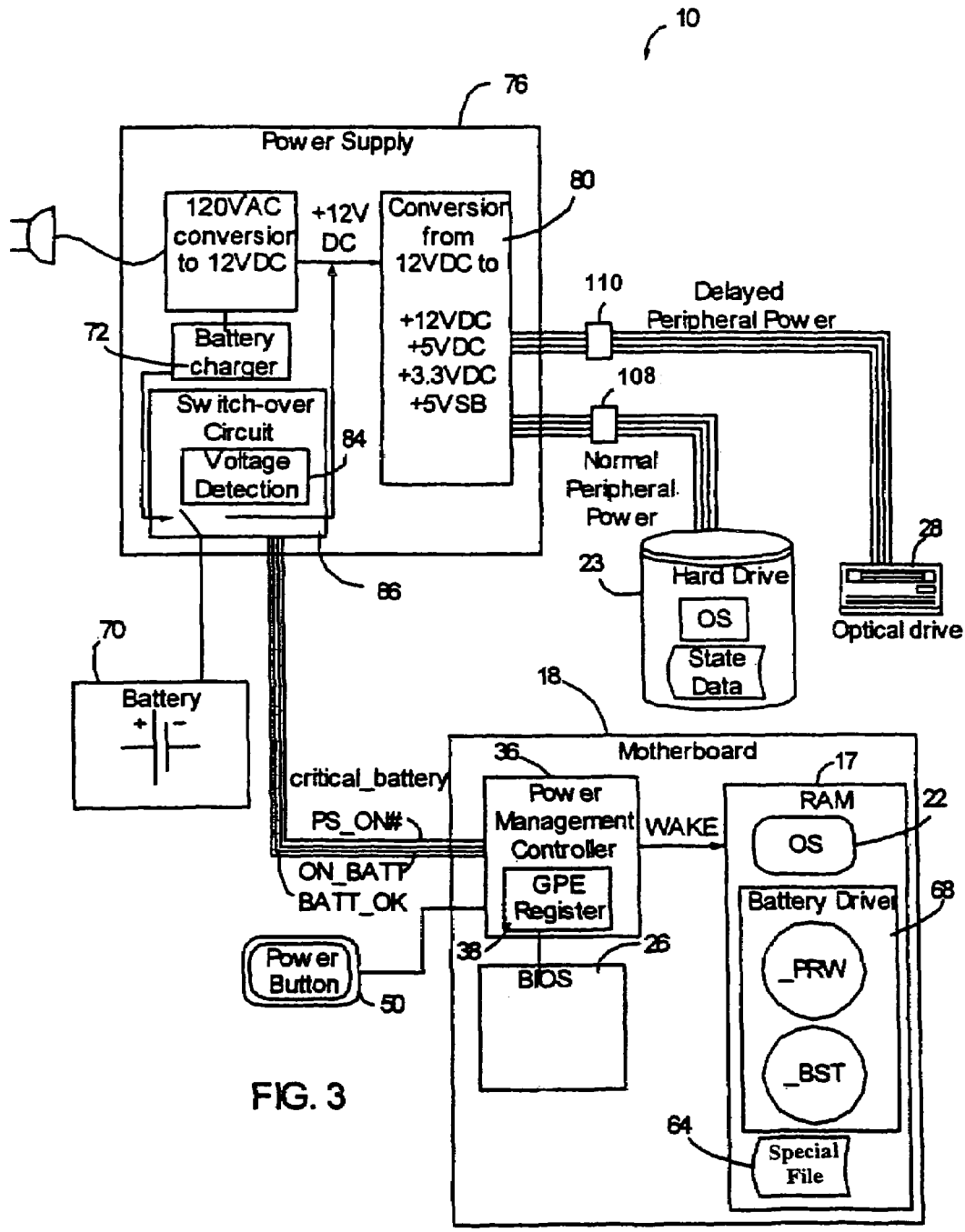
FIG. 3 is a schematic diagram showing components involved in a mechanism in accordance with an embodiment of the invention for providing dependable power for preserving state data to allow system recovery in the event an AC power failure occurs when the computer is in a standby state.

Referring to FIG. 3, when the computer is in the standby mode and the user presses the power button 50, the power button event signal generated by the power button is routed to the power management controller 36, which then sends a wake signal to wake the system. It will be appreciated that pressing the power button is not the only event that may wake up the computer from the standby state. For instance, other events, such as receiving a special kind of LAN packet or an inbound modem call, can also trigger a wake-up operation, depending on how the system is set up. Such wake events are conventional and need not be described further.

In accordance with an aspect of the invention, the personal computer 10 is normally powered by the AC power. As illustrated in FIG. 3, the computer 10 has a power supply that receives AC power (e.g., 115V at 50/60 Hz) via a power cord that has a plug for plugging into an AC outlet. In the embodiment in FIG. 3, the power supply 76 has an AC-to-DC section that converts the AC voltage into a suitable DC voltage, such as +12V. The DC output of the AC-to-DC section 78 is then used as the input for a DC-to-DC section 80 that generates several different DC voltages, such as +12V, +5V, +3.3V, and +5VSB, for powering various components and of the computer system. Since the computer 10 is powered by the AC power, it operation is affected by the loss of the AC power. An AC power failure that occurs during the working state (SO) or standby state (S3) normally causes a conventional computer to lose its system state information, because the computer does not have the opportunity to save the state data before the power is gone. Also, when the AC power is restored, the conventional computer would require a full boot up sequence, and after the boot the computer cannot resume the system state it was in prior to the power failure since the state data were lost.

The mechanism of the invention solves this problem by utilizing an energy storage medium to provide the DC power needed by the power supply 76 to generate the DC voltages for operating the computer after the AC power fails. The energy storage medium provides a DC output voltage, which is connected to the power supply 76 of the computer for conversion to the DC voltages required to operate the internal components of the computer. In contrast to the operation of an Uninterruptible Power Supply (UPS) commonly used to provide AC backup power for a computer, the energy storage medium only powers the necessary components for the operation of preserving the state data, such as the motherboard and the hard drive (and/or the optical drive), and does not power the external peripheral devices (monitor, printer, etc.), which require AC power for operation and are typically plugged into the computer to receive the AC power. The energy storage medium may be mounted inside the computer housing, or alternatively may be external to the computer 10 and connected to the power supply 76 of the computer via suitable cabling and connectors.

In a preferred embodiment, the energy storage medium is a battery 70. The battery 70 sustains the operation of the computer 10 long enough for the operating system to save the state data and to go to a persistable off state in which the state data are persistently stored (e.g., in a non-volatile memory such as the hard drive) before the battery power is disconnected. Such persistable off state may be, for instance, the S4 state of the ACPI specification. When the computer enters the S4 state (often called the "hibernation" state), it first writes the contents of the RAM 17 and some CPU settings to a special file 64 on the hard drive 23 before shutting the power off. Later, when the computer 10 awakes from hibernation, it does not have to go through a full boot sequence. Instead, after BIOS post, it reads the contents of the data saved in the special file 64 back into the RAM 17, thus restoring itself to the same condition it was in when the hibernation starts.

Since the backup battery 70 only has to sustain the operation of the computer long enough for the computer to enter the persistable off state, the requirement on its power capacity is not great. Also, because the battery may be used many times during the lifetime of the computer, it is preferably rechargeable and reliable. Furthermore, to keep the cost of the computer low, the battery is preferably relatively inexpensive. In one implementation, the backup battery 70 is a sealed lead-acid battery, which meets these requirements. The battery has a suitable voltage, such as 12 volts. It will be appreciated that other types of rechargeable energy storage medium, such as Ni-Cad, Ni-MH, and Li-on batteries, and high-capacity capacitors, may also be used.

As illustrated in FIG. 3, the power supply includes a battery charger circuit 72 and a switchover circuit 86. The battery 70 is connected to the switchover circuit 86, which connects the charger 72 to the battery when the power supply 76 receives adequate AC power input. The switchover circuit 86 includes a voltage detection circuit 84 that detects the presence of the AC power as well the voltage of the battery so that it can determine whether there is an AC power failure and whether the DC voltage of the battery is adequately high. When an AC power failure is detected, the switchover circuit 86 connects the battery 70 to the input of the DC-to-DC section 80 of the power supply 76. The DC voltage of the battery 70 is then converted by the DC-to-DC section 80 into the different output DC voltages.

To indicate the status of the battery power usage, the switchover circuit 86 is implemented to provide two signals, BATT_OK and ON_BATT. The BATT_OK signal indicates whether the battery has enough voltage to support the computer 10 to go through a hibernation sequence. The ON_BATT signal indicates whether the system is being powered by the battery 70. This signal is asserted by the power supply 76 when the AC power is not present and the battery 70 has sufficient stored energy as indicated by the BATT_OK signal being asserted high. The ON_BATT signal is routed to a general-purpose event (GPE) register 38 on the power management controller 36, which is capable of supplying a wake signal through a system control interrupt (SCI).

The system BIOS 26 implements a control method battery 66 in the ACPI namespace, defining the _BST and _PRW objects. The _BST and _PRW objects are actually implemented in a battery driver 68 that is part of the operating system. When the ON_BATT signal is asserted high due to an AC power failure when the system is in the working state, the SCI produced by the GPE register 38 is processed by the ACPI driver. The _Exx method of the ACPI driver issues a Notify 0x80 to the battery driver 68, which in response runs the _BST object and reports the battery critical flag to the operating system 22 to indicate that the system is in a critical energy state. The operating system 22 is configured to enter the hibernation state in response to receiving the critical battery alarm signal. When the transition to hibernation is complete, the motherboard 18 releases the PS_ON# line of the power supply 76 so that the PS_ON# line goes high. This tells the power supply 76 that the system is in hibernation. In response, the switchover circuit 86 returns the ON_BATT signal to "low," and disconnects the battery 70 from the power supply to preserve the energy of the battery.

If an AC power failure occurs when system is in the standby state and the PS_ON# line is de-asserted by the motherboard (such as when the motherboard 18 is in the S3 state), the switch-over circuit 86 connects the DC voltage of the battery 70 to the DC-to-DC section 80 of the power supply so that the system is on battery power, and asserts the ON_BATT high. The ON_BATT signal is routed to the GPE 38 on the power management controller 36. The _PRW object of the battery driver 68 in the is run to supply the wake signal to the power management controller. As a result, the system wakes to the S0 state. This is indicated by the motherboard's asserting the PS_ON# low. Once the operating system 22 resumes the working state, the battery driver 68 issues a critical battery alarm, which is routed to the operating system. It should be noted that the critical battery alarm is sent for the purpose of triggering the operating system to enter hibernation and does not indicate the actual battery energy level. Thus, the alarm is sent even though the battery 70 is not at a low energy level. In response to the critical battery alarm, the operating system 22 starts the hibernation sequence. When the hibernation is complete, the motherboard 18 releases the PS_ON# line. In response, the power supply 76 disconnects the battery.

An AC power outage is typically not a single episode of lost power followed by uninterrupted resumption of clean power. Rather, the AC power may flicker on and off for an extended period, such as during a thunderstorm. In that case, if the computer is rebooted every time the AC power returns and goes through the battery-powered shut down process when the AC power goes off again, the battery power may be drained quickly. In accordance with a feature of a preferred embodiment, this problem is solved by having the power management controller 36 wait until the AC power is steady for a programmable pre-selected time before waking the system. This prevents the battery power from being consumed by repeatedly putting the system in hibernation while the AC power is unstable. This determination of whether the AC power has been steady long enough may be made by, for example, checking the reading of a hardware timer that starts running when the AC power returns.

In accordance with a feature of a preferred embodiment, when the battery power is switched in, the power supply 76 makes power for some of the internal peripheral devices immediately available, but delays the power for other internal peripheral devices. As illustrated in FIG. 3, the output of the power supply 76 includes "normal power" connectors 108 that provide power immediately after the ON_Batt signal is asserted, and "delayed power" connectors 110 for providing power that is available after a pre-selected time period after the assertion of the ON_BATT signal. In one implementation, the delayed power on the connectors 110 becomes valid seven (7) seconds after the power on the normal connectors 108 has become valid. The purpose for this delayed power is to distribute peaks in the load presented to the power supply 76, especially in the case where a peripheral device presents an initial surge in its power demand. For instance, such a surge occurs when an optical disk drive has to spin up. In one implementation as illustrated in FIG. 3, the hard disk 23 are connected to the normal peripheral power connectors 108, and optical disks 28 are connected to the delayed peripheral power connectors 110.

Figure 4:
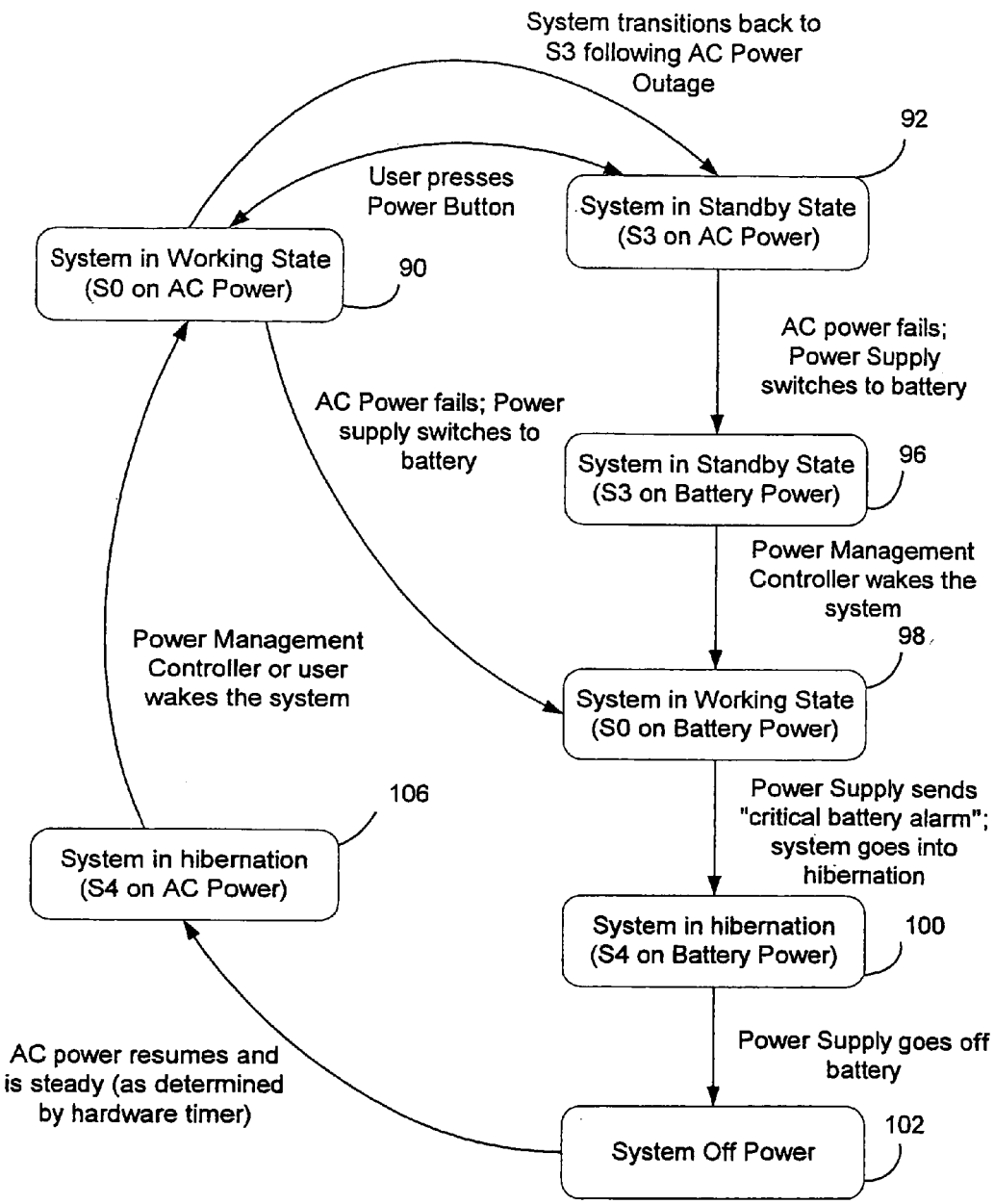
FIG. 4 is a schematic diagram showing transitions between power states of the computer in accordance with an embodiment of the invention.

The possible transitions between the power states of the computer system in a preferred embodiment is summarizes in FIG. 4. When the computer system is in the working state 90 (e.g., the ACPI S0 state) on AC power and the user presses the power button, the power management controller instructs the operating system to enter the standby state 92 (e.g., the ACPI S3 state). In the standby state, the computer is still on the AC power. If the user then presses the power button to turn the computer on, the power management controller sends a wake signal to wake the system, and the computer resumes the working state. It should be noted that these two transitions are conventional and are standard on personal computers that support the ACPI states.

If the AC power fails when the computer is in the standby state, the battery power is switched in, and the computer, including the power management controller, is now powered by the battery (the "S3 on battery" state 96). In response to the detection of the AC power failure, the power supply asserts the ON_BATT signal, which causes the power management controller to wake up the computer system from the standby state. As a result, the computer system goes to the working state powered by the battery (the "S0 on battery" state 98). The battery driver 68 then sends a "critical battery alarm" event signal to the operating system. In response, the operating system puts the system in the hibernation state (e.g., the ACPI S4 state), with the state data persisted on the hard drive. After the system is in the hibernation state (the "S4 on battery state" 100), the power supply disconnects the battery to preserve the battery power. At this time, the entire computer system is in a completely powered-off state 102.

In one implementation, the computer is set to boot up after a power failure. When the AC power returns, the power management controller, now on the AC power, waits for the AC power to be steady for a pre-selected time period and then causes the computer system to return from the full "off" state to the hibernation state (the "S4 on AC power" state 106). Later, the computer system may be waken up from the hibernation state by the power management controller or by the user pressing the power button, and the computer system resumes the working state 90 using the state data stored on the hard drive before the computer entered the hibernation state. Thereafter, the power management controller instructs the operating system to go to the standby state 92. Thereafter, when the user presses the power button again, the computer immediately resumes the working state 90. Thus, even with the intervening AC power outage, the computer does not change the way it responses to the power button signal and is able to immediately respond to the pressing of the power button or other triggering events, as if the AC power failure never happened.

The AC power failure may also occur when the computer is in the working state 90. In this case, the power of the backup battery immediately switches in, and the computer remains in the working state while being powered by the battery (the state 98). The battery driver then sends the "critical battery alarm" event to the operating system, causing the computer to be transitioned to the hibernation state 100, in the same way as described above.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for performing steps comprising:
   providing an energy storage medium having a DC voltage;
   upon an AC power failure occurring while a computer is in a standby state, connecting the energy storage medium to a power supply of the computer for powering operations of the computer, the power supply having a DC-to-DC conversion section and the energy storage medium being connected to an input of the DC-to-DC conversion section;
   waking the computer from the standby state to enter a working state in response to the AC power failure;
   sending a backup-power-critical signal to an operating system of the computer to trigger the operating system to store state data of the computer in a non-volatile memory and put the computer into a hibernation state, the backup-power-critical signal being sent when the energy storage medium is not at a critically low energy level; and
   disconnecting the energy storage medium from the power supply after the computer is in the hibernation state.

2. A computer-readable medium as in claim 1, having further computer-executable instructions for performing the step of waking the computer from the hibernation state when the AC power returns and restoring the computer to a system state prior to the AC power failure using the stored state data.

3. A computer-readable medium as in claim 2, having further computer-executable instructions for performing the step of determining whether the AC power is steady for a pre-selected period of time after the AC power returns prior to waking the computer from the hibernation state.

4. A computer-readable medium as in claim 2, having further computer-executable instructions for performing the step of returning the computer to the standby state after the system state is restored.

5. A computer-readable medium as in claim 1, wherein the energy storage medium includes a rechargeable battery.

6. A computer-readable medium as in claim 5, wherein the power supply includes a charger circuit.

7. A computer-readable medium as in claim 5, having further computer-executable instructions for performing the step of connecting the battery to the charger circuit to charge the battery when the AC power is available.

8. A computer-readable medium as in claim 1, wherein the standby state is the S3 state of the Advanced Configuration and Power Interface (ACPI) specification.

9. A computer-readable medium as in claim 1, wherein the non-volatile memory is a hard drive.

10. A computer-readable medium as in claim 1, having further computer-executable instructions for performing the step of detecting the DC voltage of the energy storage medium for determining whether the energy storage medium contains sufficient energy for powering the computer to enter the hibernation state.

11. A computer-readable medium as in claim 10, having further computer-executable instructions for performing the step of generating a signal to indicate that the energy storage medium contains sufficient energy for powering the computer to enter the hibernation state.

* * * * *